US012587092B2

(12) United States Patent
Chiba et al.

(10) Patent No.: US 12,587,092 B2
(45) Date of Patent: Mar. 24, 2026

(54) POWER FACTOR CORRECTION CIRCUIT

(71) Applicant: GS Yuasa International Ltd., Kyoto (JP)

(72) Inventors: Akiteru Chiba, Kyoto (JP); Keita Ishikura, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 253 days.

(21) Appl. No.: 18/694,377

(22) PCT Filed: Sep. 16, 2022

(86) PCT No.: PCT/JP2022/034684
§ 371 (c)(1),
(2) Date: Mar. 21, 2024

(87) PCT Pub. No.: WO2023/048074
PCT Pub. Date: Mar. 30, 2023

(65) Prior Publication Data
US 2024/0396438 A1     Nov. 28, 2024

(30) Foreign Application Priority Data

Sep. 22, 2021     (JP) ................................. 2021-153857

(51) Int. Cl.
*H02M 1/42*          (2007.01)
*H02M 1/00*          (2006.01)
*H02M 7/217*         (2006.01)

(52) U.S. Cl.
CPC ....... *H02M 1/4266* (2013.01); *H02M 1/0009* (2021.05); *H02M 1/0058* (2021.05); *H02M 7/217* (2013.01)

(58) Field of Classification Search
CPC .... H02M 1/42; H02M 1/4266; H02M 1/0009; H02M 1/0058; H02M 7/217
See application file for complete search history.

(56) References Cited

U.S. PATENT DOCUMENTS

2010/0110739 A1* 5/2010 Nishikawa .......... H02M 1/4225
                                                          363/124
2019/0319528 A1  10/2019 Matsuura et al.
(Continued)

FOREIGN PATENT DOCUMENTS

JP        2016-220342 A      12/2016
JP        2019-187104 A      10/2019
(Continued)

OTHER PUBLICATIONS

Huang, et al., "Predictive ZVS Control With Improved ZVS Time Margin and Limited Variable Frequency Range for a 99% Efficient, 130-W/in3 MHz GaN Totem-Pole PFC Rectifier", *IEEE Transactions on Power Electronics*, vol. 34, No. 7, Jul. 2019, p. 7079-7091.
(Continued)

*Primary Examiner* — Adolf D Berhane
(74) *Attorney, Agent, or Firm* — Buchalter LLP

(57)     ABSTRACT

A power factor correction circuit includes a series circuit in which a reactor L and a control switch Q1 are connected in series to both ends of a rectifier circuit 2 that rectifies input voltage of an AC power supply, a series circuit in which a synchronous rectification switch Q2 and an output capacitor C1 are connected to two main terminals of the control switch, and a control circuit 10 that alternately turns on and off the control switch and the synchronous rectification switch so that output voltage of the output capacitor becomes a first predetermined value and controls ON time of the control switch so that a peak value of current flowing through the control switch is proportional to input voltage. The control circuit turns on and off the control switch and the synchronous rectification switch so as to adjust a reverse excitation amount for reverse excitation of the reactor by causing current flowing through the reactor to reversely flow from the output voltage side to the input voltage side, and the
(Continued)

reverse excitation amount is adjusted to a second predetermined value regardless of input voltage Vi.

14 Claims, 12 Drawing Sheets

(56)                    References Cited

U.S. PATENT DOCUMENTS

| | | | |
|---|---|---|---|
| 2021/0126525 A1 | 4/2021 | Sato et al. | |
| 2022/0271654 A1* | 8/2022 | Ohtake | ............... H02M 1/4233 |
| 2023/0231490 A1* | 7/2023 | Uemura | .............. H02M 1/0009 |
| | | | 363/127 |

FOREIGN PATENT DOCUMENTS

| | | | |
|---|---|---|---|
| JP | 2021-040479 | A | 3/2021 |
| JP | 2021-052578 | A | 4/2021 |
| JP | 2021-069253 | A | 4/2021 |
| WO | WO 2020/066027 | A1 | 4/2020 |

OTHER PUBLICATIONS

International Search Report and Written Opinion for Patent Cooperation Treaty Application No. PCT/JP2022/034684, dated Nov. 15, 2022, 8 pages.

* cited by examiner

Current envelope

Switching reactor
current IL

Iin

Current envelope

Fig. 6

Broken line: input current Iin
Solid line: switching current envelope

POWER FACTOR CORRECTION CIRCUIT

CROSS REFERENCE TO RELATED APPLICATIONS

This application is a National Stage Application, filed under 35 U.S.C. § 371, of International Application No. PCT/JP2022/034684, filed Sep. 16, 2022, which international application claims priority to and the benefit of Japanese Application No. 2021-153857, filed Sep. 22, 2021; the contents of both of which are hereby incorporated by reference in their entirety.

BACKGROUND

Technical Field

The present invention relates to a power factor correction circuit.

Description of Related Art

In a conventional critical power factor correction (PFC) circuit that performs synchronous rectification, zero voltage switching (ZVS) has not been able to be performed unless a ratio between an instantaneous value Vin of input voltage and output voltage Vo is equal to or more than a predetermined value (2Vin≤Vo). Further, since a frequency changes according to input voltage, high efficiency has not been able to be obtained.

In view of the above, in Patent Document 1: JP-A-2016-220342, a boost chopper circuit of synchronous rectification is set to a predetermined value such that choke coil current flowing through an output choke coil flows in both a positive direction and a negative direction within one cycle of switching when output current is equal to or less than a rated value. For this reason, parasitic capacity of a main switching element can be extracted as a rectifier element is turned off in a state where current of an output choke coil is directed in a negative direction.

That is, when a main switching element is off, an output choke coil is reversely excited from output via a rectifier element, so that voltage of the main switching element decreases, and zero voltage switching can be performed.

However, in Patent Document 1, power factor correction operation of inputting alternating current and improving a power factor is not considered, and a reverse excitation amount is not adjusted at the time of control.

In view of the above, in Patent Document 2: JP-A-2021-052578, as a power factor correction circuit capable of zero voltage switching regardless of an instantaneous value of input voltage and a value of output voltage, reverse current is calculated and obtained. Here, a circuit configuration example of the power factor correction circuit of Patent Document 2 is illustrated in FIG. 14.

In particular, in Patent Document 2, from Formula 1 (Formula 7 of Patent Document 2) below,

[Mathematical formula 1]

$$Ir \geq \sqrt{\frac{C}{L} Vo(2Vin - Vo)} \qquad \text{(Formula 1)}$$

an asymptote of reverse current as in Formula 2 (Formula 9 of Patent Document 2) below is obtained.

[Mathematical formula 2]

$$IR = IR(Vin) = \sqrt{\frac{C}{L}} Vin \qquad \text{(Formula 2)}$$

Here, since input voltage Vin is an instantaneous value of AC input voltage, provision of reverse current Ir of Formula 2 means that zero voltage switching can be performed at any voltage at which the input voltage Vin is lower than output voltage Vo if reverse flow is generated at least at a fixed numerical value shown in Formula 3 (Formula 10 of Patent Document 2) below at all times with respect to the AC input voltage instantaneous value.

[Mathematical formula 3]

$$\sqrt{C/L} \qquad \text{(Formula 3)}$$

That is, in a case where the reverse current Ir is equal to or more than a fixed numerical value indicated by Formula 3, zero voltage switching becomes possible.

BRIEF SUMMARY

However, in the power factor correction circuit of Patent Document 2, an amount of the reverse current IR is substantially zero when a phase angle of the AC input voltage Vin is around zero degrees (or 180 degrees), and at this time, input current Iin is also substantially zero, according to Formula 2 described above. Therefore, according to Formula 4 (Formula 13 in Patent Document 2) below described in Patent Document 2, ON time tonQ1 of a control switch Q1 that controls a power factor is also substantially zero.

[Mathematical formula 4]

$$tonQ1 = \qquad \text{(Formual 4)}$$

$$\frac{2L}{Vin}(Iin + IR) = \frac{2L}{Vin}\left(Iin + \sqrt{\frac{C}{L}} Vin\right) = 2\left(L\frac{Iin}{Vin} + \sqrt{LC}\right)$$

Therefore, ON time tonQ2 of a synchronous rectification switch Q2 also becomes substantially zero from Formula 5 (Formula 14 of Patent Document 2) below.

[Mathematical formula 5]

$$tonQ2 = \frac{Vp}{Vo - Vp} tonQ1 \qquad \text{(Formula 5)}$$

That is, in the power factor correction circuit of Patent Document 2, when a phase angle of the AC input voltage Vin is around zero degrees (or 180 degrees), a switching cycle becomes very small and a switching frequency becomes high. In the power factor correction circuit of Patent Document 2, both the input voltage Vin and the input current Iin are low when a phase angle is around zero degrees, but when a frequency is high, switching loss becomes conspicuous, and high efficiency cannot be expected.

Furthermore, according to Formula 4 described above, since the ON time tonQ1 of the control switch Q1 is substantially zero, excitation energy of a reactor is also small, and a parasitic capacitor or an external capacitor C cannot be charged to reach the output voltage Vo during a dead time period until the synchronous rectification switch Q2 is turned on after the control switch Q1 is turned off. Therefore, since reactor excitation energy cannot be sent to the output side when the synchronous rectification switch Q2 is turned on, energy cannot be sent from the input side to the output side, and input current is interrupted and current distortion occurs (see FIG. 16). This causes harmonic current distortion, reduces a power factor, and increases harmonic distortion.

The power factor correction circuit of Patent Document 2 is what is called a critical method. In a power factor correction circuit constant of FIG. 14, a maximum value of a switching frequency with respect to an AC phase angle is about 3.5 times a minimum value as illustrated in FIG. 15. This is a switching frequency characteristic that is not much different from that of a critical power factor correction circuit of a conventional example, and switching loss has not been able to be reduced, and circulation loss has not been able to be reduced much by charge-discharge of switch parasitic capacity or the like.

One aspect of the present invention provides a power factor correction circuit capable of performing zero voltage switching of a control switch regardless of an instantaneous value of input voltage and a value of output voltage.

In order to solve the above problem, a power factor correction circuit according to an aspect of the present invention includes a rectifier circuit that rectifies input voltage of an AC power supply, a first series circuit in which a reactor and a control switch are connected in series to both ends of the rectifier circuit, a second series circuit in which a synchronous rectification switch and an output capacitor are connected in series to two main terminals of the control switch, and a control circuit that alternately turns on and off the control switch and the synchronous rectification switch such that output voltage of the output capacitor becomes a first predetermined value, and controls ON time of the control switch such that a peak value of current flowing through the control switch is proportional to the input voltage. The control circuit turns on and off the control switch and the synchronous rectification switch so as to adjust a reverse excitation amount that reversely excites the reactor by causing current flowing through the reactor to flow backward from an output voltage side to an input voltage side, and the reverse excitation amount is adjusted to a second predetermined value regardless of the input voltage.

Here, to "adjust" may be to make a value closer to a command value (for example, a fixed or calculated value) or to make a value closer to a value according to a measured value such as output voltage. A management apparatus according to one aspect of the present disclosure includes an acquisition unit that acquires a current value and a voltage value of an energy storage device, and a calculation unit that calculates a current limit value along a current limit characteristic of the energy storage device based on internal resistance of the energy storage device and the acquired current value and voltage value.

BRIEF DESCRIPTION OF THE FIGURES

FIG. 6 is a diagram illustrating a relationship between an AC phase angle and a switching frequency of the power factor correction circuit according to a modification example of the first embodiment.

DETAILED DESCRIPTION OF VARIOUS EMBODIMENTS

Hereinafter, a power factor correction circuit according to an embodiment of the present invention will be described in detail with reference to the drawings.

The power factor correction circuit according to the embodiment enables zero voltage switching when a control switch is off at all phase angles of AC voltage, and enables power factor correction with less distortion. Further, the power factor correction circuit makes ON time of a control switch constant when a load fluctuates due to adjustment of a reverse excitation amount, and enables power factor correction with less distortion.

Since the critical power factor correction circuit according to the embodiment causes current to flow backward into a reactor and performs resonance operation (soft switching), in a case where an existing relatively inexpensive FET is used, switching loss can be reduced to a small value. In a case where a relatively expensive latest or next generation switching device is used for this critical power factor correction circuit, high efficiency can be maintained without impairing of a characteristic of the device.

First Embodiment

A power factor correction circuit according to a first embodiment will be described with reference to a circuit configuration diagram.

Figure 1:
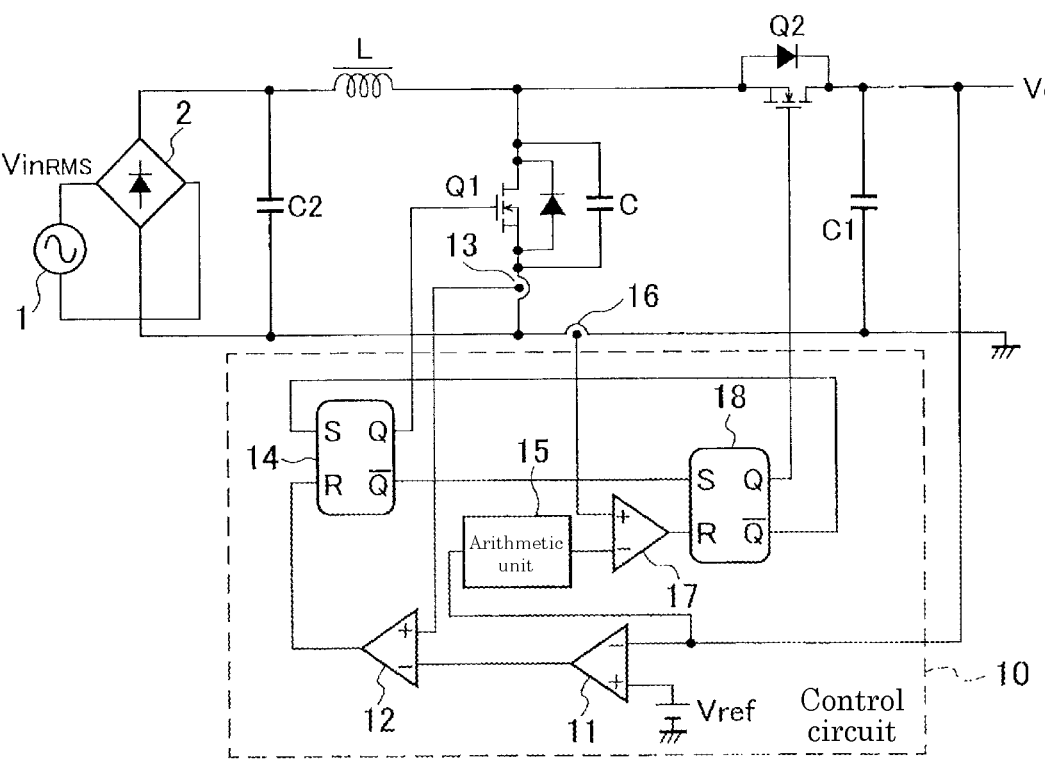
FIG. 1 is a circuit configuration diagram of a power factor correction circuit according to a first embodiment.

FIG. 1 is a circuit configuration diagram of the power factor correction circuit according to the first embodiment. The power factor correction circuit includes an AC power supply 1, a full-wave rectifier circuit 2 that full-wave rectifies input voltage of the AC power supply 1, and an input capacitor C2 connected to both ends of the full-wave rectifier circuit 2.

A reactor L and a control switch Q1 including a metal-oxide-semiconductor field-effect transistor (MOSFET) are connected in series to both ends of the full-wave rectifier circuit 2.

A synchronous rectification switch Q2 and an output capacitor C1 are connected in series to a drain terminal and a source terminal of the control switch Q1. Output voltage Vo is output from both ends of the output capacitor C1.

A control circuit 10 includes an error amplifier 11, comparators 12 and 17, RS flip-flop circuits 14 and 18, and an arithmetic unit 15. The error amplifier 11 amplifies error voltage between output voltage Vo and reference voltage Vref, and outputs the amplified error voltage to an inverting input terminal of the comparator 12. A current sensor 13 detects drain current flowing through the control switch Q1.

When error voltage from the error amplifier 11 is equal to or more than voltage based on current detected by the current sensor 13, the comparator 12 outputs low level to a reset terminal R of the RS flip-flop circuit 14. At this time, since high level is output from an output terminal Q of the RS flip-flop circuit 14, the control switch Q1 is turned on. Since low level is output from an inverting output terminal of the RS flip-flop circuit 14 to a set terminal S of the RS flip-flop circuit 18, the synchronous rectification switch Q2 is turned off.

When error voltage from the error amplifier 11 is less than voltage based on current detected by the current sensor 13, the comparator 12 outputs high level to the reset terminal R of the RS flip-flop circuit 14. At this time, since low level is output from the output terminal Q of the RS flip-flop circuit 14, the control switch Q1 is turned off. Since high level is output from an inverting output terminal of the RS flip-flop circuit 14 to the set terminal S of the RS flip-flop circuit 18, the synchronous rectification switch Q2 is turned on. In the above manner, as the control switch Q1 and the synchronous rectification switch Q2 are alternately turned on and off, the output voltage Vo of the output capacitor C1 can be controlled to have a first predetermined value.

Further, the control circuit 10 controls ON time of the control switch Q1 so that a peak value of current flowing through the control switch Q1 is proportional to input voltage Vin. For this reason, the arithmetic unit 15 arithmetically amplifies the output voltage Vo, and outputs the arithmetically amplified output voltage Vo from an inverting output terminal of the RS flip-flop circuit 18 to the set terminal S of the RS flip-flop circuit 14 via the comparator 17 to turn on the control switch Q1.

Further, the control circuit 10 turns on and off the control switch Q1 and the synchronous rectification switch Q2 so as to adjust a reverse excitation amount of reversely excitation of the reactor L by causing current flowing through the reactor L to flow backward from the output voltage Vo side to the input voltage Vin side.

That is, immediately after excitation energy of the reactor L is released by turning on of the synchronous rectification switch Q2, the synchronous rectification switch Q2 is continuously turned on to cause current to flow backward from the output capacitor C1 to the input voltage Vin side.

An amount of current to be caused to flow backward is determined using at least a coefficient based on an inductance value L of the reactor L and a parasitic capacity value C of the control switch Q1 for boosting, and the output voltage Vo.

By the above, energy for absorbing charge charged in the parasitic capacity C of the control switch Q1 for boosting is stored in the reactor L.

In order to adjust a reverse excitation amount, the power factor correction circuit illustrated in FIG. 1 includes the arithmetic unit 15, a current sensor 16, and the comparator 17. The arithmetic unit 15 arithmetically amplifies the output voltage Vo and outputs the arithmetically amplified output voltage Vo to an inverting input terminal of the comparator 17. The arithmetic unit 15 obtains a command value (second predetermined value) of the reverse current Ir regardless of input voltage Vi as shown in Formula 6 by arithmetically amplifying the output voltage Vo.

[Mathematical formula 6]

$$Ir = \sqrt{\frac{C}{L}}\, Vo \cdot \alpha \qquad \text{(Formula 6)}$$

Here, $\alpha$ represents a first term that is a real number having a magnitude of one or more. Since the output voltage Vo is DC voltage, the output voltage Vo takes a constant value (first predetermined value). For this reason, calculation according to Formula 6 requires a smaller calculation load as compared with a case where the input voltage Vin whose instantaneous value changes is used for calculation of the reverse current Ir.

The current sensor 16 corresponds to a reverse excitation current detection unit, and detects reverse excitation current flowing when the reactor L is reversely excited. The comparator 17 corresponds to a zero voltage switching determination unit, determines that the zero voltage switching of the control switch Q1 is possible when a value of reverse excitation current detected by the current sensor 16 is equal to or more than output from the arithmetic unit 15, and outputs high level to the reset terminal R of the RS flip-flop circuit 18.

For this reason, low level of the synchronous rectification switch Q2 is output from the output terminal Q of the RS flip-flop circuit 18, the synchronous rectification switch Q2 is turned off, and reverse current stops.

As described above, turning on and off of the control switch Q1 and the synchronous rectification switch Q2 are controlled in order to cause current having a value obtained by multiplying the output voltage Vo by a fixed numerical value shown in Formula 6 to flow backward to the reactor L. By the above, zero voltage switching of the control switch Q1 can be easily performed in all phase angle ranges of input voltage changing in a sine wave without change of a circuit configuration from a conventional critical power factor correction circuit.

The control switch Q1 and the synchronous rectification switch Q2 are controlled to be complementarily turned on and off by provision of dead time.

In Patent Document 2, the reverse current Ir is obtained by multiplying a proportional constant by an instantaneous value of the input voltage Vin.

On the other hand, in the power factor correction circuit according to the first embodiment, the DC output voltage Vo (or a value Voα equal to or more than Vo) is multiplied by a proportionality constant (Formula 3) as shown in Formula 6, and the reverse current Ir is set to a fixed value.

Figure 2:
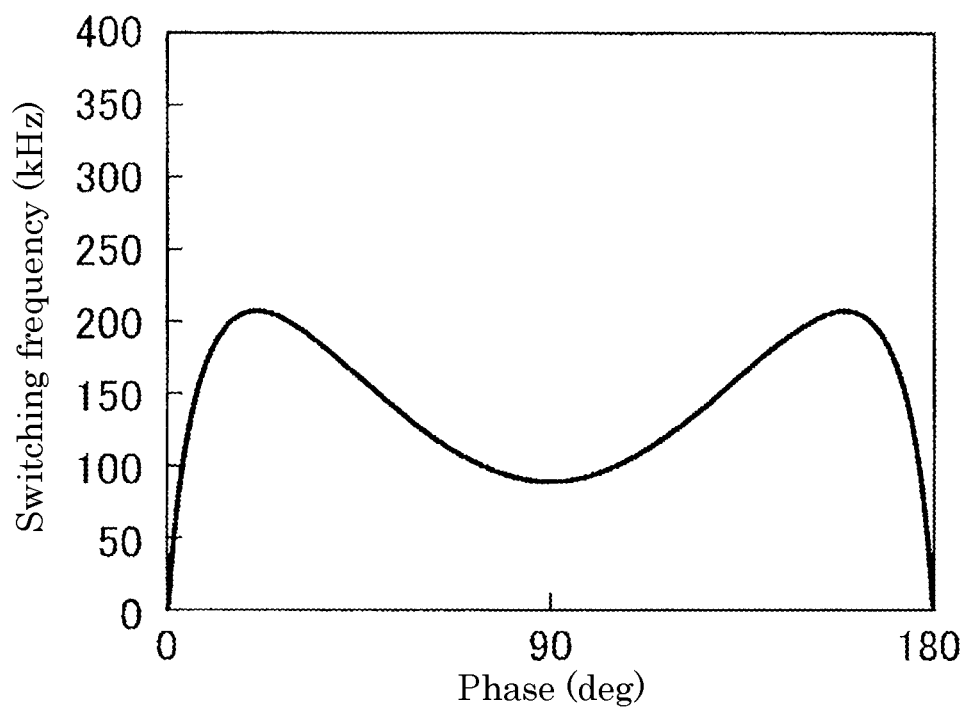
FIG. 2 is a diagram illustrating a relationship between an AC phase angle and a switching frequency (when $\alpha=1$) of the power factor correction circuit according to the first embodiment.
Figure 15:
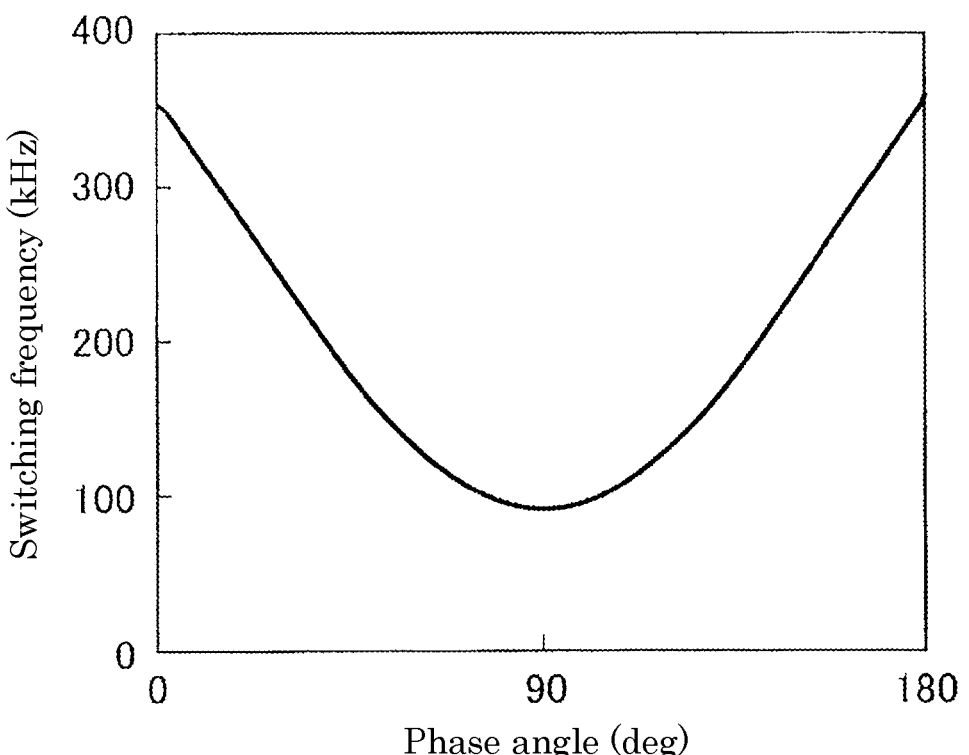
FIG. 15 is a diagram illustrating a relationship between an AC phase angle and a switching frequency of the power factor correction circuit of the conventional example illustrated in FIG. 14.
Figure 16:
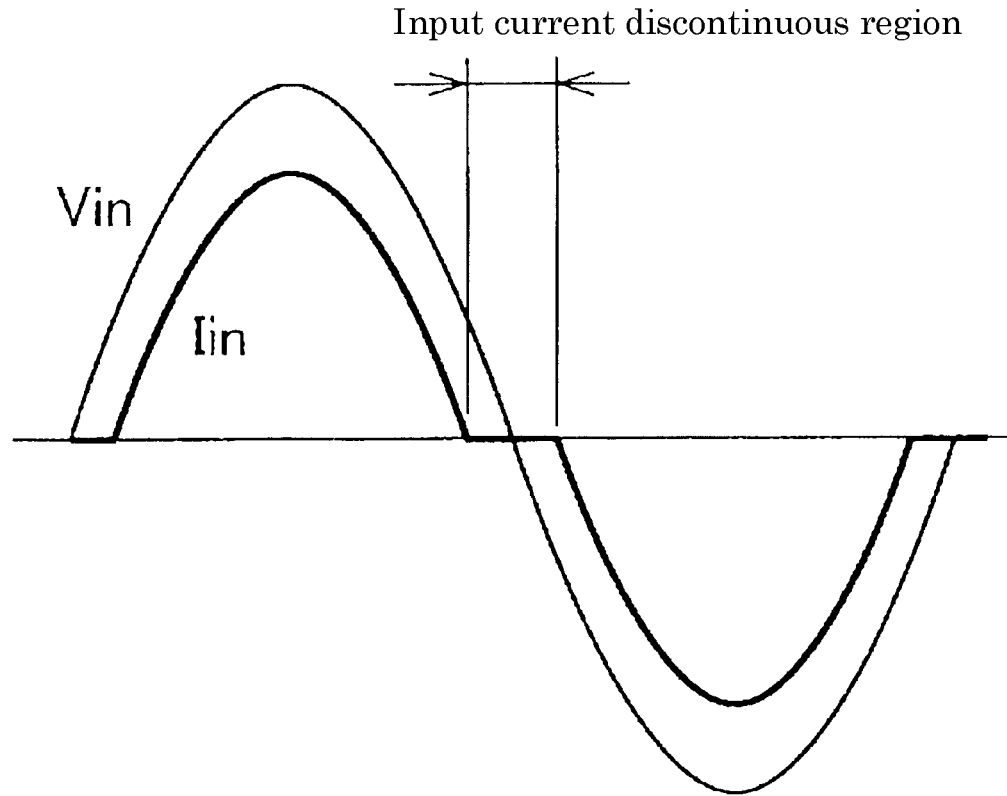
FIG. 16 is a diagram illustrating a relationship between input voltage Vin and input current Iin and an input current discontinuous region of the power factor correction circuit of the conventional example illustrated in FIG. 14.

By the above, in the power factor correction circuit according to the first embodiment, as illustrated in FIG. 2 (in a case where α=1), switching can be performed at a sufficiently low frequency as compared with the power factor correction circuit of the conventional example (Patent Document 2) illustrated in FIG. 15, and particularly, a frequency can be greatly lowered near a phase angle of zero degrees.

Figure 3:
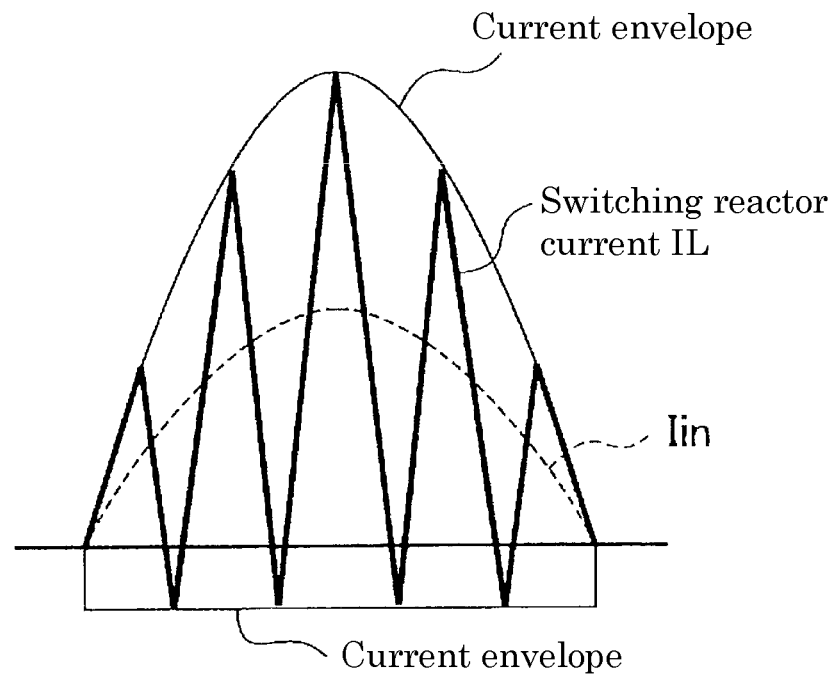
FIG. 3 is a diagram illustrating AC input current, switching reactor current, and a switching reactor current peak value envelope of the power factor correction circuit according to the first embodiment.

FIG. 2 is a graph showing a switching frequency with respect to an AC input phase angle when a first term α=1 in Formula 6. FIG. 3 is a diagram illustrating AC input current, switching reactor current, and a switching reactor current peak value envelope. A peak value (negative peak value) at the time of reverse flow of switching reactor current, that is, a current envelope on the lower side in FIG. 3 is straight or substantially straight. This means that a reverse excitation amount is adjusted to a second predetermined value regardless of input voltage. Referring to switching reactor current and the input current Iin in FIG. 3, when the first term α>1, as a reverse flow rate further increases, the ON time tonQ1 of the control switch Q1 and the ON time tonQ2 of the synchronous rectification switch Q2 can be increased and a switching frequency can be lowered in order to maintain Iin.

Figure 4:
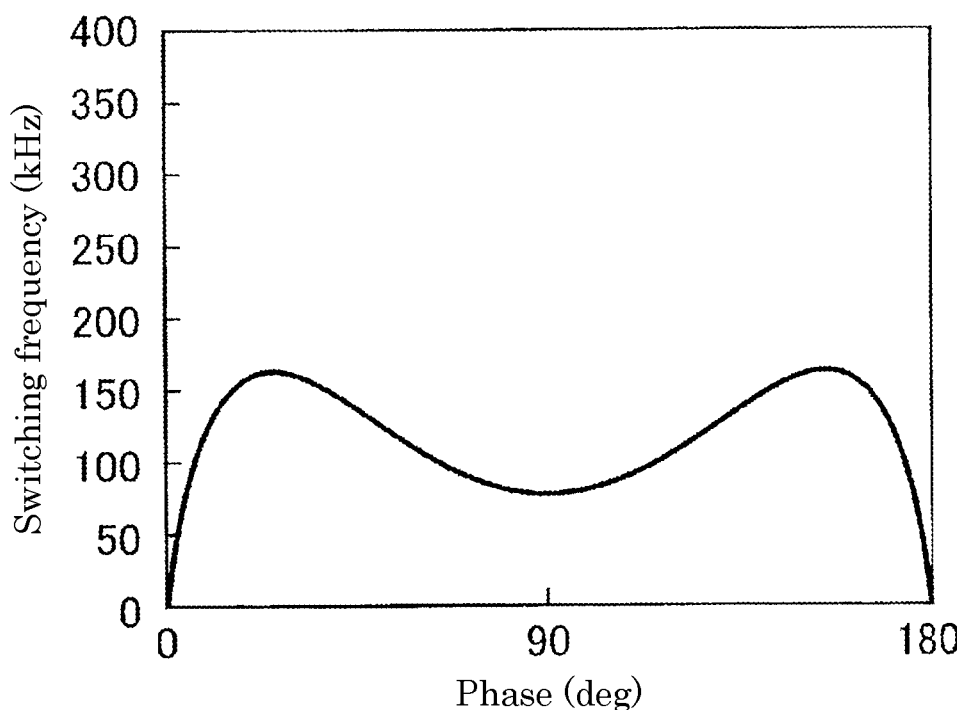
FIG. 4 is a diagram illustrating a relationship between an AC phase angle and a switching frequency (when $\alpha=1.5$) of the power factor correction circuit according to the first embodiment.

FIG. 4 illustrates a relationship between an AC phase angle and a switching frequency when α=1.5. For example, by setting α=1.5 as illustrated in FIG. 4, a switching frequency can be further lowered, and switching loss and circulation loss due to parasitic capacity can also be greatly reduced.

Further, by setting α=1.5 as illustrated in FIG. 4, a switching frequency can be lowered in the vicinity of a phase angle of zero degrees. That is, by setting α=1.5, the ON time tonQ1 of the control switch Q1 in Formula 4 (Formula 13 in Patent Document 2) can be increased, excitation energy of the reactor L increases, and a parasitic capacitor or the external capacitor C can be caused to reach the output voltage Vo during a dead time period until the synchronous rectification switch Q2 is turned on after the control switch Q1 is turned off. For this reason, when the synchronous rectification switch Q2 is turned on, reactor excitation energy can be sent to the output side, that is, energy can be sent from the input side to the output side, so that interruption of the input current Iin is improved, a power factor is improved, and harmonic distortion can also be reduced.

Modification Example of First Embodiment

Next, a power factor correction circuit according to a modification example of the first embodiment will be described with reference to FIG. 5.

Figure 5:
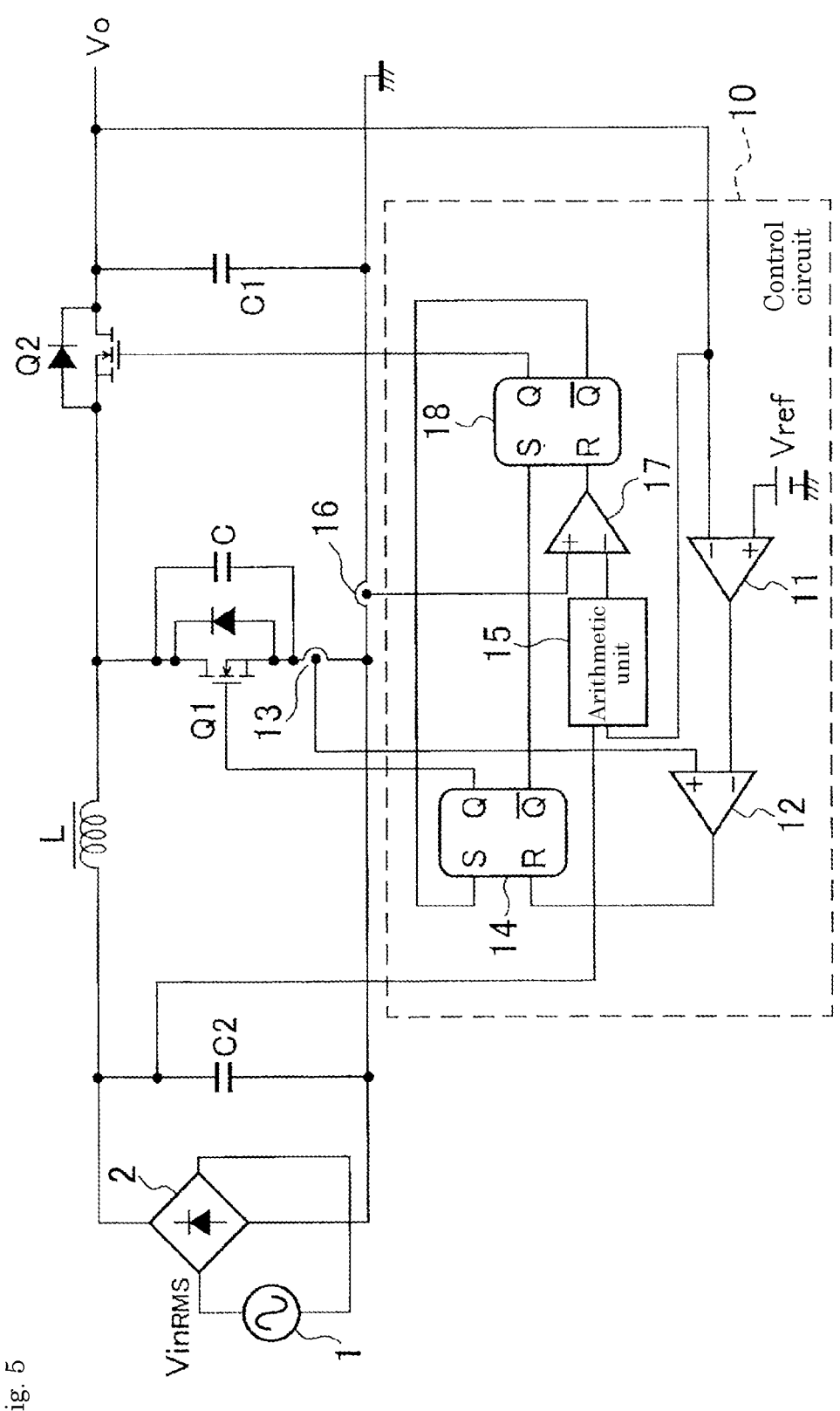
FIG. 5 is a circuit configuration diagram of the power factor correction circuit according to a modification example of the first embodiment.

In the power factor correction circuit according to the modification example illustrated in FIG. 5, output of the full-wave rectifier circuit 2 is further input to the arithmetic unit 15 as compared with the power factor correction circuit according to the first embodiment illustrated in FIG. 1. Other configurations of the power factor correction circuit according to the modification example are the same as those of the power factor correction circuit according to the first embodiment, and will be omitted from detailed description.

Since output of the full-wave rectifier circuit 2 is further input to the arithmetic unit 15, the reverse current Ir can be set as in Formula 7 below.

[Mathematical formula 7]

$$Ir = \sqrt{\frac{C}{L}} \, (Vo \cdot \alpha + \beta) \qquad \text{(Formula 7)}$$

Figure 6:
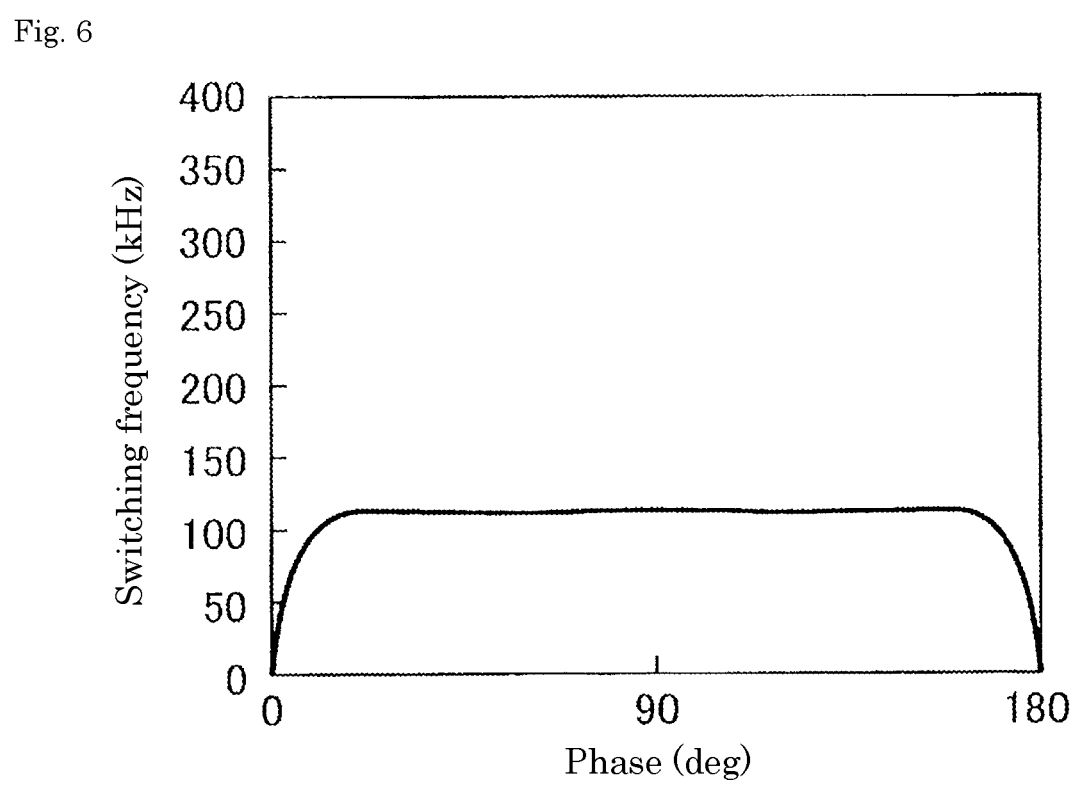

Here, the second term β is a harmonic component three times the AC input voltage Vin alternating at an angular frequency ω. As a frequency of the AC input voltage Vin which is set to a harmonic of three times by a phase-locked loop or the like is added to the reverse current Ir in the arithmetic unit 15 as illustrated in FIG. 5, a flat shape in which a switching frequency is controlled with respect to an input phase angle is obtained as illustrated in FIG. 6, and switching loss can be reduced as a switching frequency is lowered. Further, since there are no various frequencies, actual damage such as specific frequency interference to another circuit can be prevented.

Figure 7:
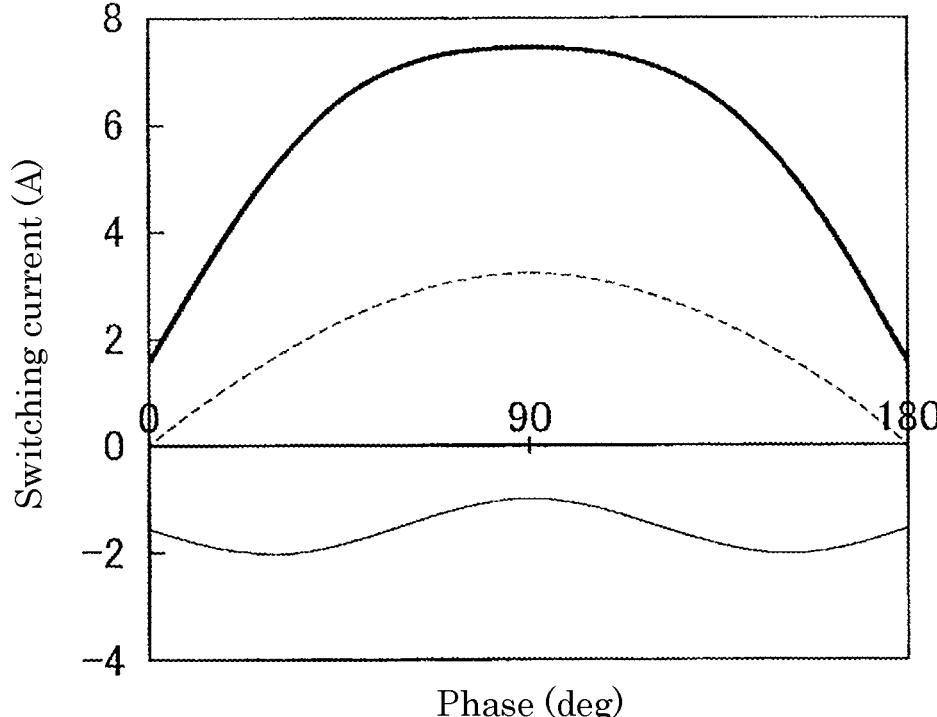
FIG. 7 is a diagram illustrating AC input current and a switching reactor current peak value envelope of the power factor correction circuit according to a modification example of the first embodiment.

FIG. 7 illustrates a switching current envelope and input current of the power factor correction circuit according to the modification example of the first embodiment. The reverse current Ir is obtained by adding a harmonic three times AC input. A harmonic of three times AC input is added to a current envelope on the lower side in FIG. 7, and a waveform adjusted to a second predetermined value appears.

The second term β may include not only a harmonic component three times the AC input voltage Vin but also a high-order harmonic component obtained by multiplication by odd numbers, such as five times and seven times. Since the second term β includes not only a harmonic component three times the AC input voltage Vin but also a high-order harmonic component obtained by multiplication by odd numbers, such as five times and seven times, a switching frequency illustrated in FIG. 6 has a further flat shape with respect to an input phase angle, and a switching frequency further decreases, so that switching loss can be further reduced.

Second Embodiment

The critical power factor correction circuit according to a second embodiment will be described with reference to FIG. 8. The power factor correction circuit according to the second embodiment is a totem pole bridge-less power factor correction circuit, and includes an AC power supply, the reactor L, current sensors 13a and 16a, the switches Q1 to Q4, an output capacitor Co, and a control circuit 10a.

Since the full-wave rectifier circuit 2 (see FIGS. 1 and 5) is not used, no loss occurs due to the full-wave rectifier circuit. That is, a bridge-less critical power factor correction circuit capable of zero voltage switching at all phase angles (in all ranges) of AC voltage is provided.

A switching reactor current peak value envelope in this power factor correction circuit indicates a waveform like alternating current in which the envelope illustrated in FIG. 3 or 7 and an envelope obtained by inverting the envelope vertically appear alternately.

The current sensor 13a is connected in series to the reactor L and detects current flowing through the reactor L.

The switch Q1 and the switch Q2 are connected in series, and one end of the reactor L is connected to a connection end between the switch Q1 and the switch Q2. A series circuit of the switch Q3 and the switch Q4 is connected to both ends of a series circuit of the switch Q1 and the switch Q2. Both ends of the output capacitor Co are connected to both ends of the series circuit of the switch Q3 and the switch Q4, and the output voltage Vo is obtained from the output capacitor Co.

The switch Q1 and the switch Q2 are complementarily turned on and off with provision of dead time, and the switch Q3 and the switch Q4 are complementarily switched in polarity with provision of dead time.

The control circuit 10a includes the error amplifier 11, the comparators 12 and 17, RS flip-flop circuits 14a and 18a, the arithmetic unit 15, a polarity determination unit 19, and polarity changeover units 20 to 22.

Figure 8:
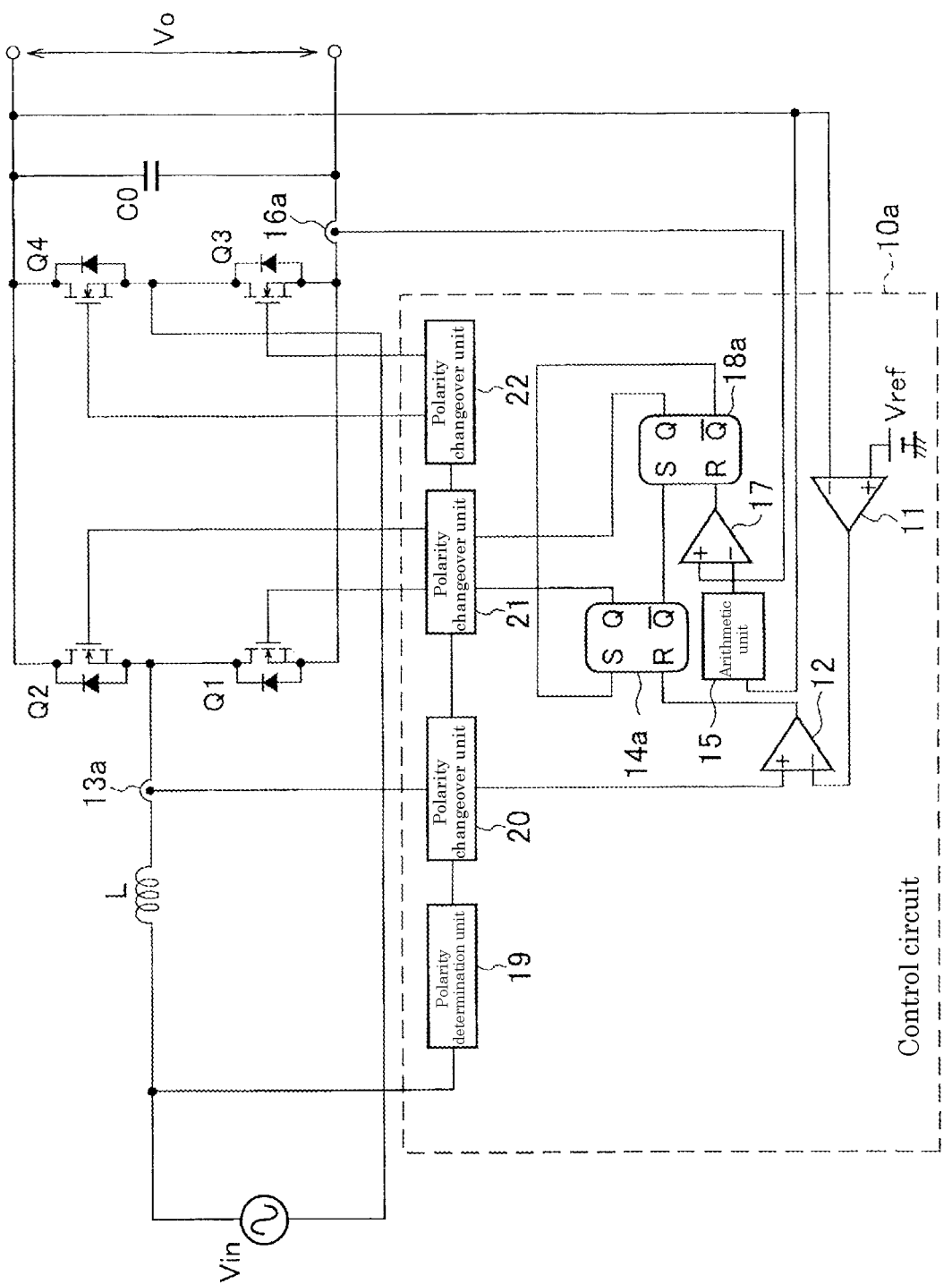
FIG. 8 is a circuit configuration diagram of the power factor correction circuit according to a second embodiment.

Functions of the error amplifier 11, the comparators 12 and 17, and the arithmetic unit 15 illustrated in FIG. 8 are the same as those illustrated in FIG. 1, and will be omitted from description.

The output terminal Q of the RS flip-flop circuit 14a is connected to one input terminal of the polarity changeover unit 21, and the output terminal Q of the RS flip-flop circuit 18a is connected to the other input terminal of the polarity changeover unit 21.

The polarity determination unit 19 determines positive or negative polarity of the input voltage Vin, and outputs positive or negative polarity to the polarity changeover units 20 to 22. When polarity determined by the polarity determination unit 19 is positive, the polarity changeover unit 21 switches Q1 to a control switch and switches Q2 to a synchronous rectification switch. The control switch Q1 is turned on and off by output from the output terminal Q of the RS flip-flop circuit 14a. The synchronous rectification switch Q2 is turned on and off by output from the output terminal Q of the RS flip-flop circuit 18a.

In a case where polarity determined by the polarity determination unit 19 is negative, the polarity changeover unit 21 switches Q1 to a synchronous rectification switch and switches Q2 to a control switch. The synchronous rectification switch Q1 is turned on and off by output from the output terminal Q of the RS flip-flop circuit 14a. The control switch Q2 is turned on and off by output from the output terminal Q of the RS flip-flop circuit 18a.

In a case where polarity determined by the polarity determination unit 19 is positive, the polarity changeover unit 22 switches on the polarity changeover switch Q3 and switches off the polarity changeover switch Q4. When polarity determined by the polarity determination unit 19 is negative, the polarity changeover unit 22 turns off the polarity changeover switch Q3 and turns on the polarity changeover switch Q4.

Figure 9:
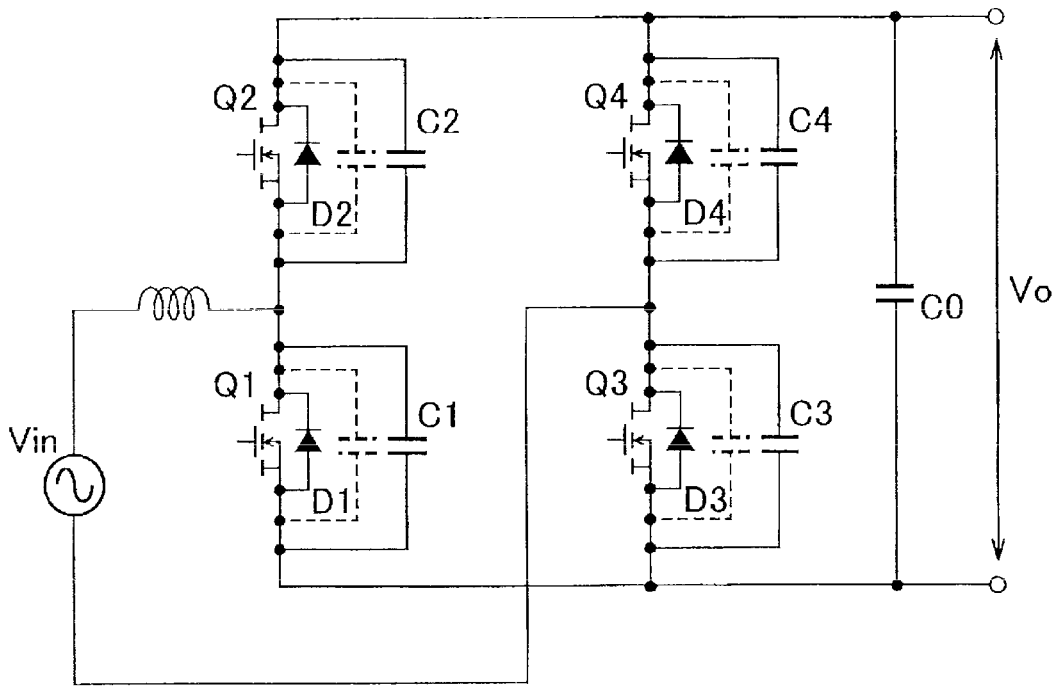
FIG. 9 is a circuit configuration diagram illustrating a control switch, parasitic capacity of a synchronous rectification switch, and an external capacitor of the power factor correction circuit illustrated in FIG. 8.

FIG. 9 illustrates parasitic capacity (capacitor indicated by a dotted line) of the switches Q1 to Q4 and the external capacitors C1 to C4 of the power factor correction circuit illustrated in FIG. 8.

Next, operation when the AC input voltage Vin is positive voltage in the power factor correction circuit according to the second embodiment illustrated in FIG. 10 will be described. At this time, by operation of the polarity determination unit 19 and the polarity changeover unit 21, Q1 operates as a control switch, Q2 operates as a synchronous rectification switch, the polarity changeover switch Q3 is turned on, and the polarity changeover switch Q4 is turned off as illustrated in FIG. 10.

Figure 10:
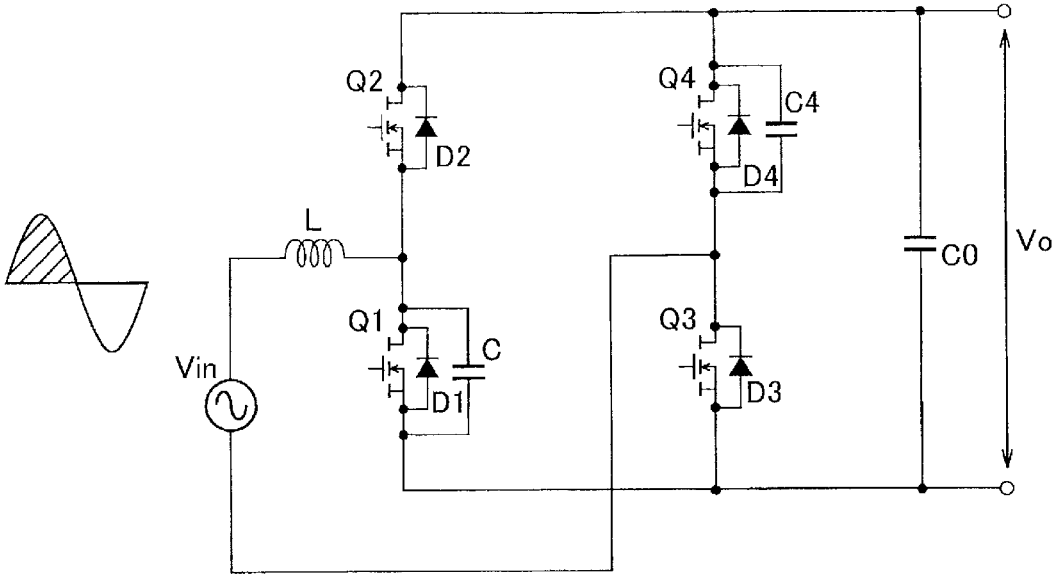
FIG. 10 is a diagram illustrating a control switch, a synchronous rectification switch, and a polarity changeover switch when AC input voltage is positive voltage in the power factor correction circuit illustrated in FIG. 8.

In order to simplify a closed circuit at this time, in FIG. 10, the capacity C of the control switch Q1 is set to C=C1+C2, and the capacity C4 of the polarity changeover switch Q4 is set. Since the polarity changeover switch Q3 is turned on and C and C4 are connected in parallel, the reverse current IR is expressed by Formula 8.

[Mathematical formula 8]

$$IR = \sqrt{\frac{C + C4}{L}} \, Vo \qquad \text{(Formula 8)}$$

At the time of reverse flow, charge of the capacitor C4 is extracted in a first path of C4→Q2→L→Vin→C4. Further, charge of the capacitor C is extracted in a second path of C→L→Vin→Q3→C. Furthermore, in a third path of Co→Q2→L→Vin→Q3→Co, reverse excitation is performed for a portion that is insufficient in reverse excitation by the capacitors C and C4.

Next, operation when the AC input voltage Vin is negative voltage will be described. At this time, by operation of the polarity determination unit 19 and the polarity changeover unit 21, as illustrated in FIG. 11, Q1 operates as a synchronous rectification switch, Q2 operates as a control switch, the polarity changeover switch Q3 is turned off, and the polarity changeover switch Q4 is turned on.

Figure 11:
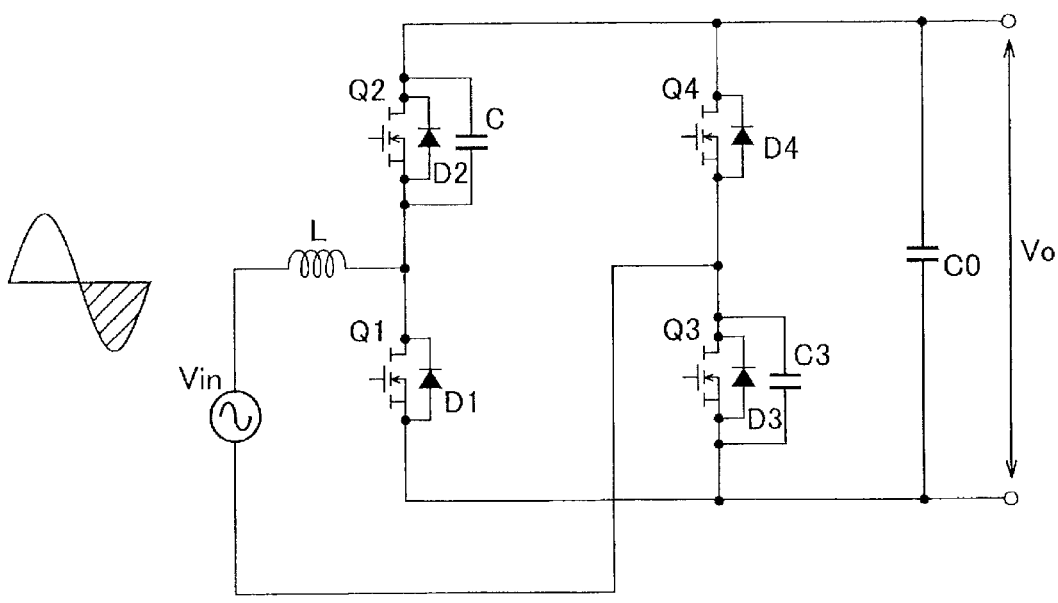
FIG. 11 is a diagram illustrating the control switch, the synchronous rectification switch, and the polarity changeover switch when AC input voltage is negative voltage in the power factor correction circuit illustrated in FIG. 8.

In order to simplify a closed circuit at this time, in FIG. 11, the capacity C of the control switch Q2 is set to C=C1+C2, and the capacity C3 of the polarity changeover switch Q3 is set. Since the polarity changeover switch Q4 is turned on and C and C3 are connected in parallel, the reverse current IR is expressed by Formula 9.

[Mathematical formula 9]

$$IR = \sqrt{\frac{C + C3}{L}} \, Vo \qquad \text{(Formula 9)}$$

At the time of reverse flow, charge of the capacitor C3 is extracted in a first path of C3→VIN→L→Q1→C3. Further, charge of the capacitor C is extracted in a second path of C→Q4→Vin→L→C. Furthermore, in a third path of Co→Q4→Vin→L→Q1→Co, reverse excitation is performed for a portion that is insufficient in reverse excitation by the capacitors C and C3.

As described above, according to the power factor correction circuit according to the second embodiment, it is possible to obtain high efficiency by zero voltage switching at a high power factor by the same control as the power factor correction circuit according to the first embodiment.

Third Embodiment

Next, the power factor correction circuit according to a third embodiment will be described with reference to FIG. 12. In the power factor correction circuit according to the first embodiment and the power factor correction circuit according to the second embodiment, the current sensor 16 is provided to detect reverse excitation current flowing when the reactor L is reversely excited.

Figure 12:
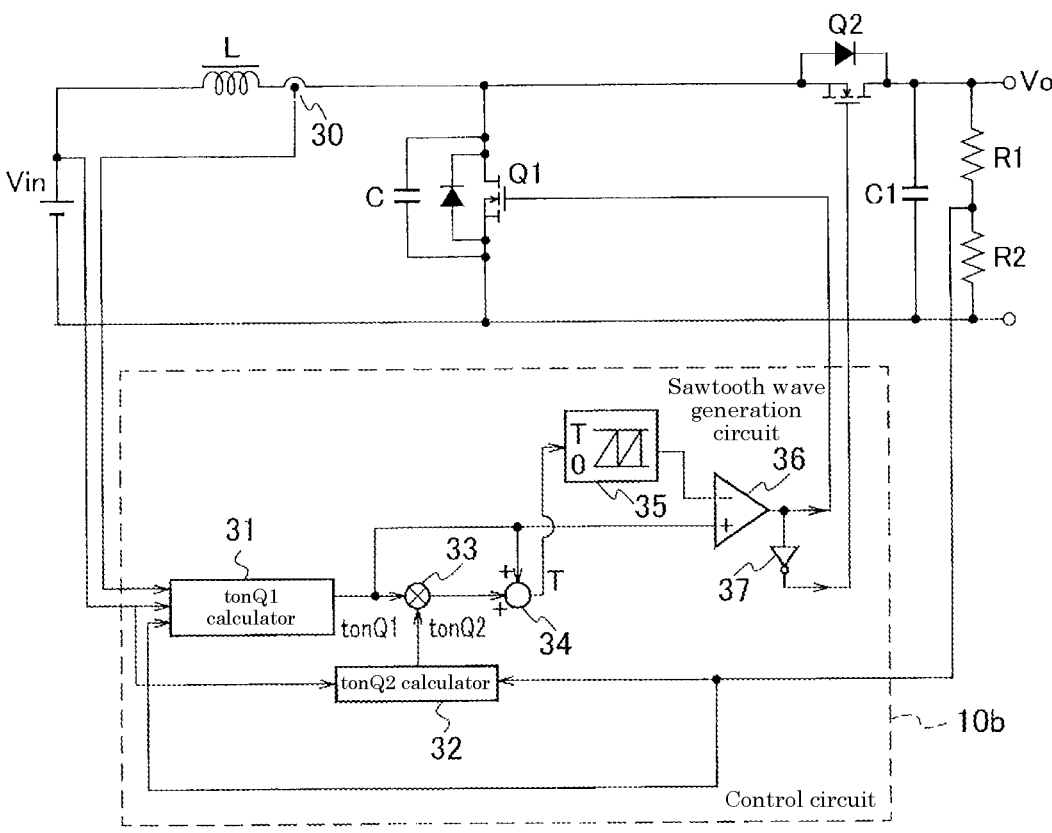
FIG. 12 is a circuit configuration diagram of the power factor correction circuit according to a third embodiment.

On the other hand, the power factor correction circuit according to the third embodiment illustrated in FIG. 12 is characterized in that the current sensor 16 illustrated in FIG. 1 is deleted, and a fixed value determined using the reactor L and the parasitic capacity value C of the control switch Q1 is added to ON time of a conventional critical PFC by digital control, so that ON time of the control switch Q1 is calculated and zero voltage switching is realized.

In the power factor correction circuit illustrated in FIG. 12, the reactor L and the control switch Q1 including a MOSFET and the current sensor 13a are connected in series to both ends of the input voltage Vin. The synchronous rectification switch Q2 and an output capacitor C0 are connected in series to a drain terminal and a source terminal of the control switch Q1. A series circuit of a resistor R1 and a resistor R2 is connected to both ends of the output capacitor C0. The output voltage Vo is output from both ends of the output capacitor C0.

A control circuit 10b includes a tonQ1 calculator 31, a tonQ2 calculator 32, a multiplier 33, an adder 34, a sawtooth wave generation circuit 35, a comparator 36, and an inverter 37.

The current sensor 13a is connected in series to the reactor L and detects the input current Iin flowing through the reactor L.

Assuming that average current of one switching cycle is the input current Iin, the ON time tonQ1 of the control switch Q1 is expressed by Formula 10. The tonQ1 calculator 31 calculates the ON time tonQ1 of the control switch Q1 by Formula 10.

[Mathematical formula 10]

$$tonQ1 = \frac{2L}{Vin}(Iin + IR) = \frac{2L}{Vin}\left(Iin + \sqrt{\frac{C}{L}}\,Vo\right) \qquad \text{(Formula 10)}$$

First ON time of the control switch Q1 of a conventional critical PFC corresponds to the first term of Formula 10. The second term of Formula 10 is second ON time determined using the reactor L, the parasitic capacity C of the control switch Q1, the input voltage Vin, and the output voltage Vo, and represents a reverse excitation amount shown in Formula 6.

That is, the ON time tonQ1 of the switch Q1 of the invention of the present application is time obtained by adding the second ON time determined using an inductance value of the reactor L, the parasitic capacity value C of the control switch Q1, and the output voltage Vo to the first ON time of the control switch Q1 of the conventional critical PFC circuit.

For this reason, the tonQ1 calculator 31 calculates the first ON time of the control switch Q1 based on the input current Iin detected by the current sensor 13a, the input voltage Vin, and a reactance value of the reactor L, and adds, to the first ON time, the second ON time determined using an inductance value of the reactor L, the parasitic capacity value C of the control switch Q1, the input voltage Vin, and the output voltage Vo to obtain the ON time tonQ1 of the control switch Q1.

That is, by adding a predetermined value determined using a reactance value of the reactor L, the parasitic capacity value C of the control switch Q1, the input voltage Vin, and the output voltage Vo to time calculated based on the input current Iin, the input voltage Vin, and a reactance value of the reactor L, it is possible to obtain the ON time tonQ1 of the control switch Q1 in consideration of a reverse excitation amount.

Therefore, by obtaining the ON time tonQ1 of the control switch Q1 in consideration of a reverse excitation amount without detection of reverse current (reverse excitation amount) as shown in Formula 6 by the current sensor 16, it is possible to realize zero voltage switching of the control switch Q1.

The tonQ2 calculator 32 calculates difference voltage (Vo–Vp) between the input voltage Vin (Vp) and the output voltage Vo, and obtains a divided value obtained by dividing the input voltage Vp by the difference voltage (Vo–Vp).

Further, for the ON time tonQ2 of the switch Q2, the multiplier 33 multiplies the ON time tonQ1 of the control switch Q1 by the divided value obtained by the tonQ2 calculator 32 from a relationship of the voltage time product of the reactor L. That is, the multiplier 33 calculates the ON time tonQ2 of the switch Q2 by Formula 11.

[Mathematical formula 11]

$$tonQ2 = \frac{Vp}{Vo - Vp}\,tonQ1 \qquad \text{(Formula 11)}$$

The adder 34 adds the ON time tonQ2 of the switch Q2 from the multiplier 33 to the ON time tonQ1 of the control switch Q1 to obtain time T. A switching cycle T is determined by the time T.

The sawtooth wave generation circuit 35 generates a sawtooth signal whose peak value is T based on the time T from the adder 34. The comparator 36 inputs a sawtooth signal from the sawtooth wave generation circuit 35 to an inverting input terminal, and inputs the ON time tonQ1 of the control switch Q1 from the tonQ1 calculator 31 to a non-inverting input terminal.

In a case where the ON time tonQ1 of the control switch Q1 from the tonQ1 calculator 31 is equal to or more than a value of a sawtooth wave signal from the sawtooth wave generation circuit 35, the comparator 36 applies a high-level signal to a gate of the control switch Q1 to turn on the control switch Q1.

Further, in a case where the ON time tonQ1 of the control switch Q1 from the tonQ1 calculator 31 is equal to or more than a value of a sawtooth wave signal from the sawtooth wave generation circuit 35, the comparator 36 inverts a high-level signal by the inverter 37 and applies a low-level signal to a gate of the switch Q2 to turn off the switch Q2.

In a case where the ON time tonQ1 of the control switch Q1 from the tonQ1 calculator 31 is less than a value of a sawtooth wave signal from the sawtooth wave generation circuit 35, the comparator 36 applies a low-level signal to a gate of the control switch Q1 to turn off the control switch Q1.

Further, in a case where the ON time tonQ1 of the control switch Q1 from the tonQ1 calculator 31 is less than a value of a sawtooth wave signal from the sawtooth wave generation circuit 35, the comparator 36 inverts a low-level signal by the inverter 37 and applies a high-level signal to a gate of the switch Q2 to turn on the switch Q2. Further, the switches Q1 and Q2 are controlled to be complementarily turned on and off by operation of the sawtooth wave generation circuit 35 and the comparator 36 with provision of dead time.

As described above, according to the power factor correction circuit according to the third embodiment, the current sensor 16 is deleted, and a predetermined value determined using the reactor L and the parasitic capacity value C is added, by digital control, to ON time of a conventional critical PFC, so that ON time of the switch Q1 can be calculated and zero voltage switching can be realized.

Fourth Embodiment

Figure 13:
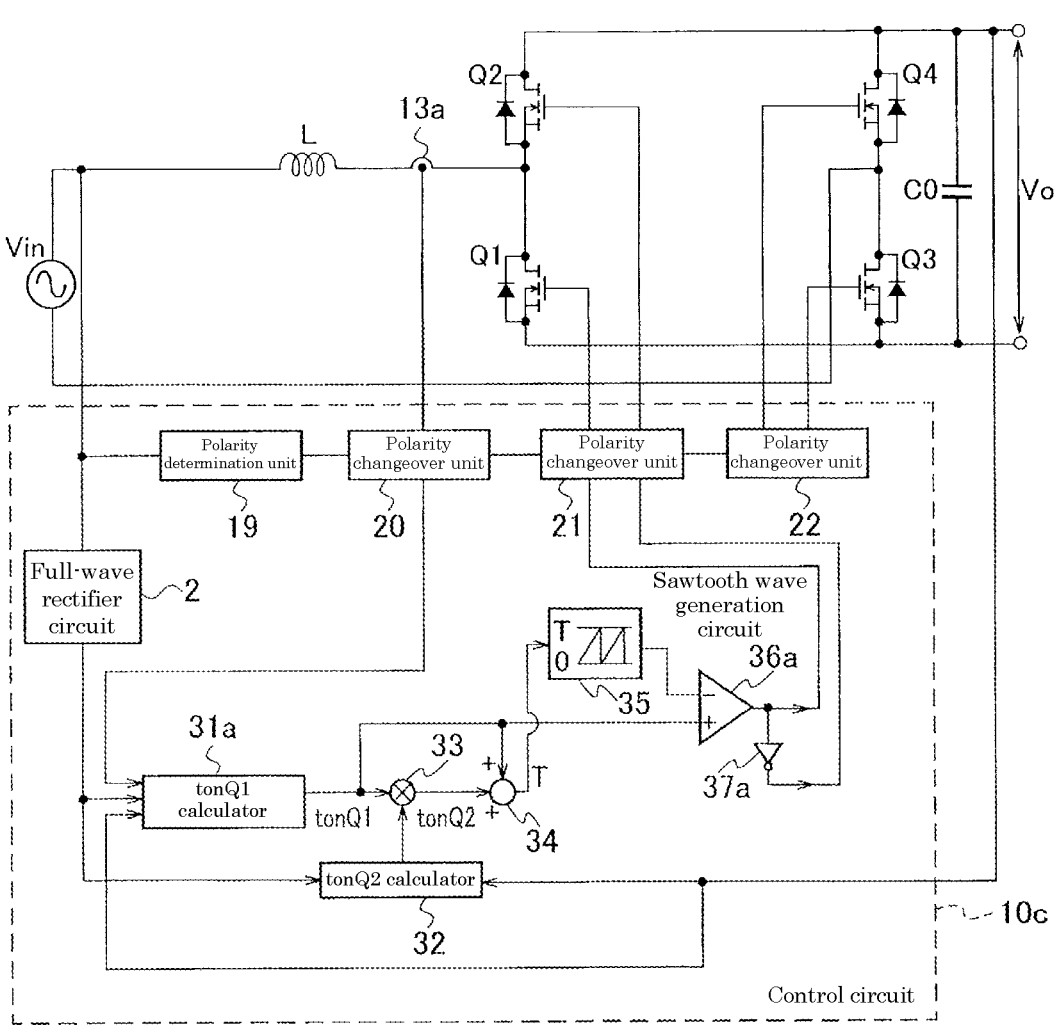
FIG. 13 is a circuit configuration diagram of the power factor correction circuit according to a fourth embodiment.
Figure 14:
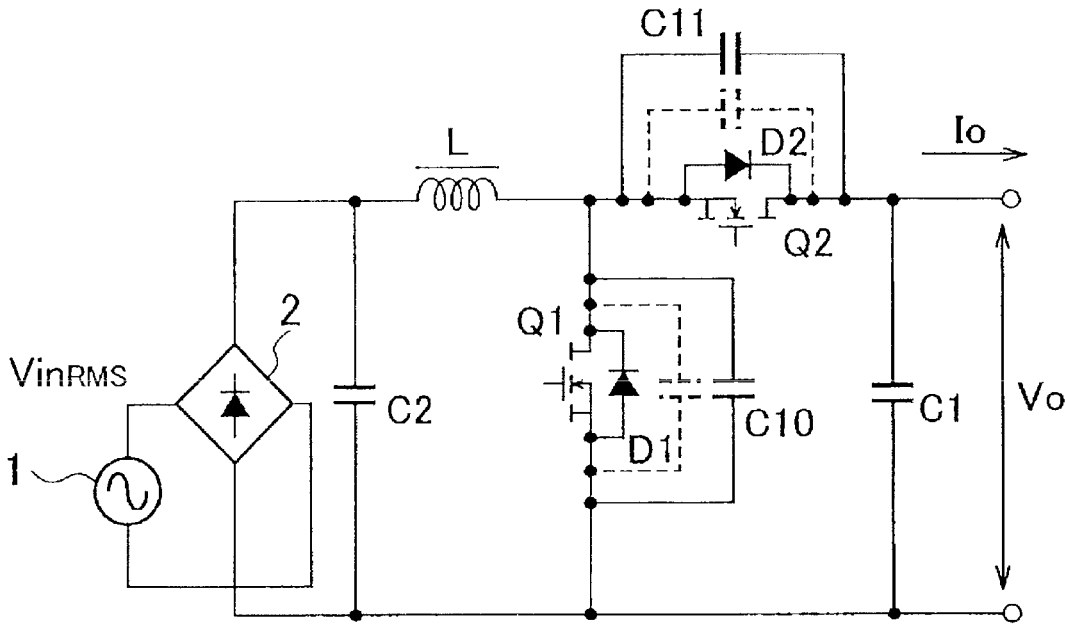
FIG. 14 is a circuit configuration diagram of a power factor correction circuit of a conventional example described in Patent Document 2.

Next, the power factor correction circuit according to a fourth embodiment will be described with reference to FIG. 13. The power factor correction circuit according to the fourth embodiment illustrated in FIG. 13 is characterized in that the current sensor 16a illustrated in FIG. 8 is deleted, and a predetermined value determined using the reactor L and the parasitic capacity value C of the control switch Q1 is added, by digital control, to ON time of a conventional critical PFC, so that ON time of the control switch Q1 is calculated and zero voltage switching is realized.

A control circuit 10c includes the full-wave rectifier circuit 2, the polarity determination unit 19, the polarity changeover units 20 to 22, a tonQ1 calculator 31a, the tonQ2 calculator 32, the multiplier 33, the adder 34, the sawtooth wave generation circuit 35, a comparator 36a, and an inverter 37a. The full-wave rectifier circuit 2, the polarity determination unit 19, and the polarity changeover units 20 to 22 are described with reference to FIG. 9, and will be omitted from description.

The tonQ1 calculator 31a calculates the first ON time of the control switch Q1 based on the input current Iin detected by the current sensor 13a, the input voltage Vin from the full-wave rectifier circuit 2, and a reactance value of the reactor L, and adds, to the first ON time, the second ON time determined using an inductance value of the reactor L, the parasitic capacity value C of the control switch Q1, the input voltage Vin, and the output voltage Vo to obtain the ON time tonQ1 of the control switch Q1. The comparator 36a outputs comparator output to the polarity changeover unit 21. The inverter 37a outputs inverter output to the polarity changeover unit 21.

The power factor correction circuit according to the fourth embodiment configured as described above includes the tonQ1 calculator 31a, the tonQ2 calculator 32, the multiplier 33, the adder 34, the sawtooth wave generation circuit 35, the comparator 36a, and the inverter 37a, so that an effect similar to that of the power factor correction circuit according to the third embodiment can be obtained.

The invention claimed is:

1. A power factor correction circuit comprising:
a reactor including one end connected to one end of an AC power supply and another end connected to a first main terminal of a control switch;
a first series circuit in which a synchronous rectification switch and an output capacitor are connected in series to the first main terminal and a second main terminal of the control switch;
a second series circuit in which a first polarity changeover switch and a second polarity changeover switch are connected in series to both ends of a series circuit of the control switch and the synchronous rectification switch; and
a control circuit that alternately turns on and off the control switch and the synchronous rectification switch so that output voltage of the output capacitor becomes a first predetermined value to control ON time of the control switch so that a peak value of current flowing through the control switch is proportional to input voltage of the AC power supply, and switches the control switch and the synchronous rectification switch according to polarity of input voltage of the AC power supply and switches processing of turning on one of the first polarity changeover switch and the second polarity changeover switch and turning off another one of the first polarity changeover switch and the second polarity changeover switch,
wherein
the control circuit turns on and off the control switch and the synchronous rectification switch so as to adjust a reverse excitation amount of reverse excitation of the reactor by causing current flowing through the reactor to flow backward from an output voltage side to an input voltage side, and
the reverse excitation amount is adjusted to a second predetermined value regardless of the input voltage.

2. The power factor correction circuit according to claim 1, wherein the reverse excitation amount is determined using an inductance value L of the reactor, parasitic capacity C of the control switch, and the output voltage Vo.

3. The power factor correction circuit according to claim 2, wherein the reverse excitation amount is determined by a first mathematical formula ($\sqrt{(C/L)} \times Vo \times \alpha$) including a coefficient based on the inductance value L of the reactor and the parasitic capacity C of the control switch, the output voltage Vo, and a first term $\alpha$ that is a real number of one or more.

4. The power factor correction circuit according to claim 2, wherein the reverse excitation amount is determined by a second mathematical formula ($\sqrt{(C/L)} \times (Vo \times \alpha + \beta)$) including a coefficient based on the inductance value L of the reactor and the parasitic capacity C of the control switch, the output voltage Vo, and a first term $\alpha$ and a second term $\beta$ that are real numbers of one or more, the second term $\beta$ being a harmonic having a frequency n times an input frequency (n is an integer of three or more).

5. The power factor correction circuit according to claim 4, further comprising:
a reverse excitation current detection unit that detects reverse excitation current flowing when the reactor is reversely excited; and
a zero voltage switching determination unit that determines that zero voltage switching of the control switch is possible when a value of reverse excitation current detected by the reverse excitation current detection unit is equal to or more than a value determined by the second mathematical formula.

6. The power factor correction circuit according to claim 3, wherein the control circuit includes a first calculator that calculates first ON time of the control switch based on input current flowing through the reactor, the input voltage, and a reactance value of the reactor, and adds, to the first ON time, second ON time determined by a reactance value of the reactor, a parasitic capacity value of the control switch, the input voltage, the output voltage Vo, and the first term $\alpha$ to obtain ON time of the control switch.

7. The power factor correction circuit according to claim 4, wherein the control circuit includes a first calculator that calculates first ON time of the control switch based on input current flowing through the reactor, the input voltage, and a reactance value of the reactor, and adds, to the first ON time, second ON time determined by a reactance value of the reactor, a parasitic capacity value of the control switch, the input voltage, the output voltage Vo, the first term $\alpha$, and the second term $\beta$ to obtain ON time of the control switch, the second term $\beta$ being a harmonic having a frequency n times an input frequency (n is an integer of three or more).

8. A power factor correction circuit comprising:
a rectifier circuit that rectifies input voltage of an AC power supply;

a first series circuit in which a reactor and a control switch are connected in series to both ends of the rectifier circuit;

a second series circuit in which a synchronous rectification switch and an output capacitor are connected in series to two main terminals of the control switch; and a control circuit that alternately turns on and off the control switch and the synchronous rectification switch such that output voltage of the output capacitor becomes a first predetermined value, and controls ON time of the control switch such that a peak value of current flowing through the control switch is proportional to the input voltage, wherein the control circuit turns on and off the control switch and the synchronous rectification switch so as to adjust a reverse excitation amount that reversely excites the reactor by causing current flowing through the reactor to flow backward from an output voltage side to an input voltage side, and the reverse excitation amount is adjusted to a second predetermined value regardless of the input voltage.

9. The power factor correction circuit according to claim 8, wherein the reverse excitation amount is determined using an inductance value L of the reactor, parasitic capacity C of the control switch, and the output voltage Vo.

10. The power factor correction circuit according to claim 9, wherein the reverse excitation amount is determined by a first mathematical formula ($\sqrt{(C/L)} \times Vo \times \alpha$ including a coefficient based on the inductance value L of the reactor and the parasitic capacity C of the control switch, the output voltage Vo, and a first term $\alpha$ that is a real number of one or more.

11. The power factor correction circuit according to claim 9, wherein the reverse excitation amount is determined by a second mathematical formula ($\sqrt{(C/L)} \times (Vo \times \alpha + \beta)$) including a coefficient based on the inductance value L of the reactor and the parasitic capacity C of the control switch, the output voltage Vo, and a first term $\alpha$ and a second term $\beta$ that are real numbers of one or more, the second term $\beta$ being a harmonic having a frequency n times an input frequency (n is an integer of three or more).

12. The power factor correction circuit according to claim 11, further comprising:

a reverse excitation current detection unit that detects reverse excitation current flowing when the reactor is reversely excited; and a zero voltage switching determination unit that determines that zero voltage switching of the control switch is possible when a value of reverse excitation current detected by the reverse excitation current detection unit is equal to or more than a value determined by the second mathematical formula.

13. The power factor correction circuit according to claim 10, wherein the control circuit includes a first calculator that calculates first ON time of the control switch based on input current flowing through the reactor, the input voltage, and a reactance value of the reactor, and adds, to the first ON time, second ON time determined by a reactance value of the reactor, a parasitic capacity value of the control switch, the input voltage, the output voltage Vo, and the first term $\alpha$ to obtain ON time of the control switch.

14. The power factor correction circuit according to claim 11, wherein the control circuit includes a first calculator that calculates first ON time of the control switch based on input current flowing through the reactor, the input voltage, and a reactance value of the reactor, and adds, to the first ON time, second ON time determined by a reactance value of the reactor, a parasitic capacity value of the control switch, the input voltage, the output voltage Vo, the first term $\alpha$, and the second term $\beta$ to obtain ON time of the control switch, the second term $\beta$ being a harmonic having a frequency n times an input frequency (n is an integer of three or more).

* * * * *